UNITED STATES PATENT OFFICE.

JOHN COTTER PELTON, OF SAN FRANCISCO, CALIFORNIA.

PROCESS OF MAKING COLORED CEMENT.

1,200,645.     Specification of Letters Patent.     Patented Oct. 10, 1916.

No Drawing.     Application filed June 18, 1914. Serial No. 845,799.

*To all whom it may concern:*

Be it known that I, JOHN COTTER PELTON, a citizen of the United States, residing at San Francisco, in the county of San Francisco and State of California, have invented a new and useful Process of Making Colored Cement.

This invention relates to a colored mineral product adapted to be used in building construction or for other uses, for example, colored sand, cement, colored whiting or Paris white, colored chalk, colored litharge and the like, and the main object of the present invention is to provide a mineral product of this character which may be produced in any desired shade of color, and adapted for use in buildings or blocks or otherwise without the mixture of any extraneous coloring matter.

A further object is to provide for securing the greatest possible uniformity in coloring.

The invention consists of saturating a mineral product with a mineral solution, and then drying and burning the material to form the desired color, and then grinding the material.

As a coloring matter I use a metallic salt or compound, capable of adding color to the product to be colored. The nature of said salt or compound depends upon the color which is to be obtained, and I apply this metallic compound to the mineral product in the form of a solution, while it is dissolved or suspended in a suitable solvent or carrying medium, and the mineral product becomes soaked and impregnated with the solution, and is then dried and burned, which brings the color and fixes the same permanently in the mineral.

In producing a product, such as Portland cement, for example, having a buff, brown or black color, I use a salt or compound of iron, and I pulverize sulfid of iron (ferric sulfid), and form a paste thereof with commercial sulfuric acid. I dilute this to any extent desired to vary the shade of color. Commercial Portland cement is then soaked with the solution so as to become saturated therewith and the product is then burned or calcined. This restores the original properties of the cement and brings out the color. The shade of color may be varied by varying the dilution of the solvent before mentioned. After burning, I grind up the material and the resultant product is a Portland cement having a permanent color of the desired shade. In producing a colored whiting or chalk or litharge or any like product, the process is the same, except that the temperature of reburning may be varied to produce different shades of color.

By using metallic salts of other kinds other colors may be produced. For example, to produce a blue color, a copper salt is employed. For this purpose pure copper may be dissolved in nitric acid, and the cement or other product to be colored may then be soaked in the solution for some time, and then burned to deepen the color of the same to the point desired. By continuing the burning operation to a sufficient extent, a black product may be produced. Where whiting is prepared in this manner and used in plastering a perfect color is produced throughout the body of the plaster, calcimining is dispensed with, and if the plastering becomes broken or chipped it does not mar the appearance as the color is not on the surface only, but is uniformly distributed throughout.

The above described process is applicable to any cementitious material which is composed of mineral constituents and which depends on the action of calcination or heat to bring it to a condition in which it will set when mixed with water and the expression "cementitious mineral product" is herein used in this sense.

What I claim is:

1. The process of making colored cement, which process comprises saturating Portland cement with a solution of inorganic coloring matter to color the cement, burning the colored cement, and then grinding the burned and colored cement to restore the original properties of the cement and bring out the color.

2. The process of making colored cement, which process comprises saturating Portland cement with a solution of a metallic salt capable of adding color to the cement, burning the colored cement, and then grinding the burned and colored cement to restore the original properties of the cement and bring out the color.

3. The process of making colored cement, which process comprises saturating Portland cement with a paste formed of ferric sulfid and sulfuric acid to color the cement, burning the colored cement, and then grinding the burned and colored cement to restore the original properties of the cement and bring out the color.

In testimony whereof, I have hereunto set my hand at Los Angeles, California, this 13th day of June, 1914.

JOHN COTTER PELTON.

In presence of—
LORA M. BOWERS,
LORRAINE E. DURROW.